Aug. 21, 1945.  C. J. GLASSER  2,383,186
BINOCULARS WITH POLARIZED LIGHT FILTERS
Filed Aug. 6, 1943  2 Sheets-Sheet 2
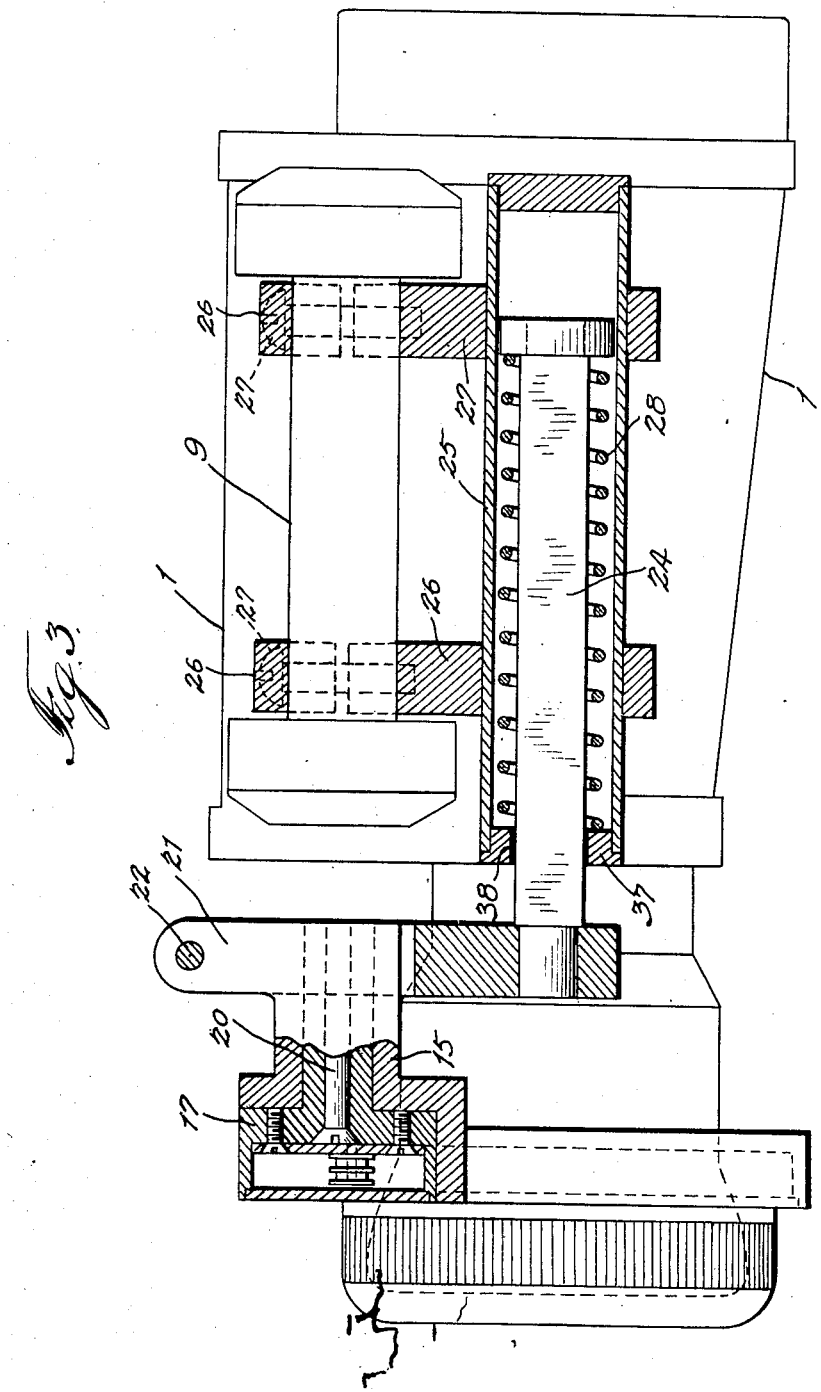

Patented Aug. 21, 1945

2,383,186

UNITED STATES PATENT OFFICE 2,383,186

BINOCULARS WITH POLARIZED LIGHT FILTERS

Charles J. Glasser, Chicago, Ill.

Application August 6, 1943, Serial No. 497,576

20 Claims. (Cl. 88—34)

My invention relates to polarized lens binoculars.

One of the objects of my invention is to provide, in combination with a pair of binoculars in which the two barrels are connected to swing about a common axis for adjustment from and toward each other, a set of adjustable polarized lenses having improved means for mounting them on the binoculars.

A further object is to provide such a construction in which the polarized lenses are so mounted that the act of adjusting a polarized lens of one barrel will automatically cause a corresponding adjustment of a polarized lens of the other barrel.

A further object of my invention is to provide such a construction with means for mounting the polarized lenses so that they can be moved out of the line of vision when desired.

Further objects and advantages of the invention will be apparent from the description and claims.

In the drawings, in which an embodiment of my invention is shown,

Fig. 3 is a section substantially on the line 3—3 of Fig. 1.

Figure 1:
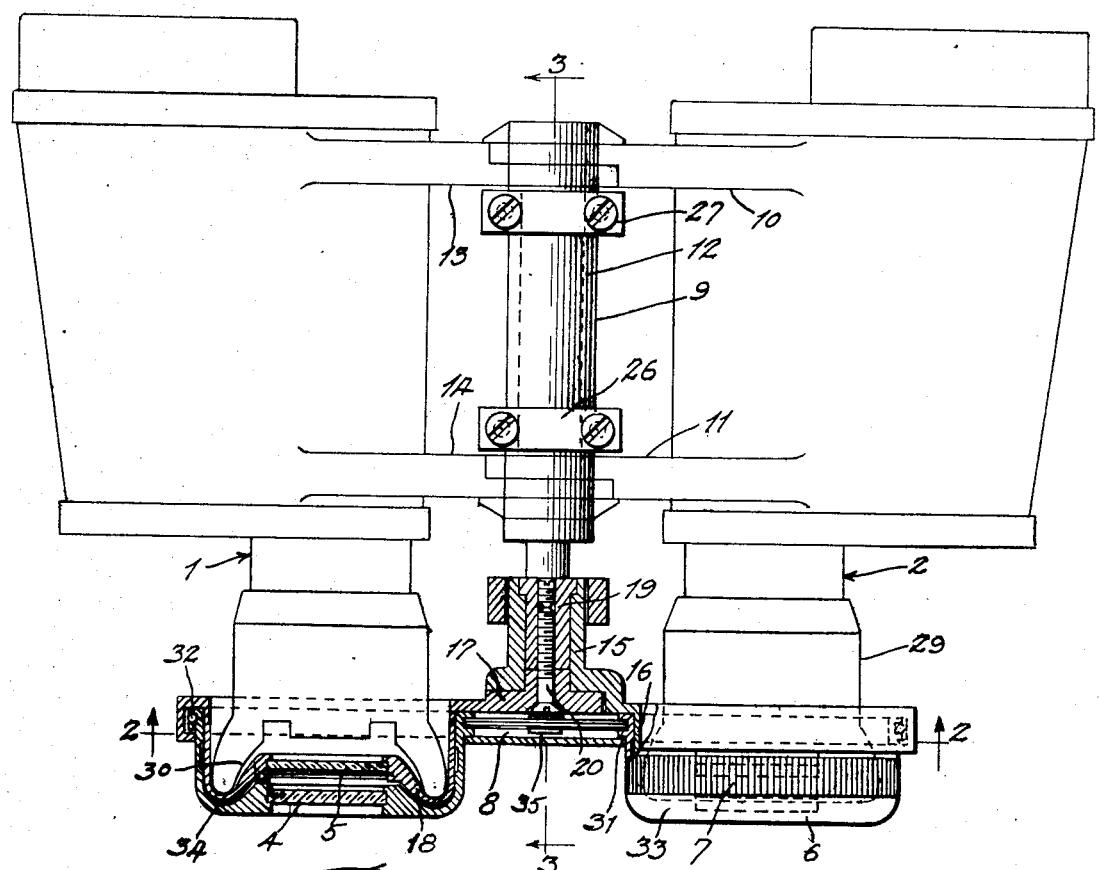
Figure 1 is a plan view of a pair of binoculars, parts being in section.
Figure 2:
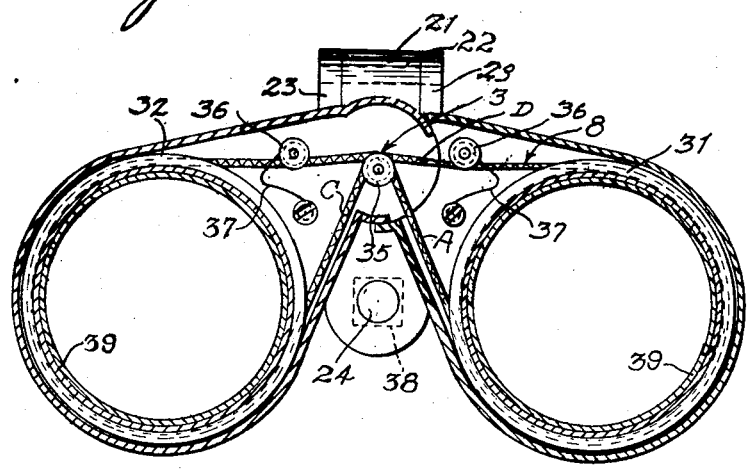
Fig. 2 is a section substantially on the line 2—2 of Fig. 1.

Referring to the drawings in detail, the construction shown comprises a pair of binoculars including two barrels 1 and 2, in which the eyepiece lens and objectives are mounted, connected to swing about a common axis at 3 for adjustment toward and from each other, two pairs of polarized lenses 4 and 5 and 6 and 7, one pair for each barrel mounted to swing about said axis 3 with the barrel, the two lenses of each pair being juxtaposed, one lens 4 and 6 of each pair being rotarily adjustable with respect to the other, and transmission means 7 between said adjustable lenses whereby rotatably adjusting one lens 4 of one pair will cause a corresponding rotary adjustment of a lens 6 of the other pair. This relative rotative adjustment of the two lenses 4 and 5 will vary the amount of light transmitted through these two lenses as is well understood. It is desirable that the percentage of light transmitted through the two barrels should be maintained substantially constant in order to give the proper depth and perspective to the objects viewed. This object is accomplished by providing a cable transmission 8 between the two lenses 4 and 6 so that when one lens 6 is turned clockwise by the user, the other lens 4 will be turned counterclockwise automatically an amount corresponding to the adjustment of the first lens.

The hinged connection between the two barrels comprises a sleeve 9 to which the hinge members 10 and 11 for one of the barrels 2 are secured and a shaft 12 rotatably mounted in this sleeve 9 to which the hinge members 13 and 14 of the other barrel are secured. The hinged connection between the two pairs of polarized lenses comprises a sleeve hinge member 15 having a cup-like portion 16 in which one of the lenses 7 is mounted, and a hinge member 17 pivotally connected to the first hinge member and having a cup-like portion 18 in which a lens 5 of the other pair is fixedly secured. The two hinge members are secured together by means of a bushing 19 having a shoulder fitting against the hinge member 15 and a screw 20 extending through the other hinge member and threaded into the bushing 19. The sleeve-like hinge member 15 has an upwardly extending portion 21 pivoted at 22 to a bifurcated post 23 which is fixedly secured to a plunger 24, slidably but nonrotatably mounted in a sleeve 25 suspended from the binocular sleeve 9 by means of a pair of hangers 26 and 27 clamped onto this sleeve 9. A coil compression spring 28 is provided which normally holds the plunger 24 and lens-carrying post 21 in the right-hand position, as viewed in Fig. 3, in which position the cup-like lens holders 16 and 18 fit over the eyepieces of the binoculars.

If, on occasion, it is desired to dispense with the polarized effect, the lens-carrying post 21 can be pulled forward to free the cups 16 and 18 from the binocular eyepieces 29 and 30 and the polarized lens-carrying construction may be swung forwardly and upwardly about the pivot pin 22 to a position where it will be out of the line of vision.

The cable transmission 8 between the two rotatably mounted lenses 6 and 4 comprises an endless cable, cord, or the like, extending over the pulleys 31 and 32 formed on the lens-carrying cups 33 and 34 and over a pair of pulleys 35 pivotally mounted on the hinge member 17 in such position that the point of contact of the cable 8 with the pulley is substantially coaxial with the axis of the hinge members 10, 11, 13 and 14. The cable portions cross each other at the point of contact with these central pulleys, the cable continuing from portion A to portion B, thence around the lens pulley, thence to portions C and D and around the other lens pulley 31. Suitable cable tightening devices may be provided if found desirable, those shown comprising small pulleys 36 mounted on a spring suspension 37 secured to the hinge members 16 and 17 and bearing downwardly on the cable portions B and D. With this construction, it will be seen that if the user adjusts the right-hand polarized lens in a clockwise direction, the left-hand polarized lens will be adjusted automatically in a counterclockwise direction an amount equal to the adjustment of the right-hand lens. If the two adjustable lenses 6 and 4 are originally mounted so that when a maximum of light is transmitted through the right-hand pair of lenses a maximum amount of light will also be transmitted through the left-hand lenses, any adjustment thereafter of the right-hand lens to lessen the amount of light transmitted through the right-hand lenses will automatically diminish proportionately the amount of light transmitted through the left-hand pair of lenses.

The cups 33 and 34 carrying the adjustable lenses 6 and 4 are rotatably mounted on the cups 16 and 18 which carry the relatively fixed lenses 7 and 8. The two hinge members 15 and 17 which carry the polarized lenses are mounted so that they will always be coaxial with the hinge members 10, 11, 13 and 14 which carry the barrels on which the eyepieces are mounted. With this construction it will be seen that the tension in the cable 8 will not be affected by the adjustment of the barrels 1 and 2 toward and from each other about the axis of the hinge members, since the lens-carrying hinge members are coaxial with the barrel carrying hinge members and the cable sections in effect swing about an axis coaxial with both pairs of hinge members. The plunger 24 is held against rotation in the barrel by means of a bushing 37 having a squared hole 38 therein in which the squared plunger is slidable. The adjustment of the barrels 1 and 2 about the axis 3 of the hinges carries with the barrels the cup members 16, 18, 33 and 34 in which the polarized lenses are mounted. The cable 8 may be formed of any suitable material, such as braided or twisted metal strands which will have the desired flexibility and nonstretchability. This cable may be fixedly secured at a point 39 to the pulleys 31 and 32 in any suitable manner as by a drop of solder, or the like.

Further modifications will be apparent to those skilled in the art and it is desired, therefore, that the invention be limited only by the scope of the appended claims.

Having thus described my invention, what I claim and desire to secure by Letters Patent is:

1. The combination with a pair of binoculars including two barrels connected to swing about a common axis for interpupillary adjustment toward and from each other and eyepieces carried by said barrel, respectively, of two pairs of polarized lenses, one pair for each barrel, means for mounting each pair to swing about said axis with the barrel and to maintain the axis of said lenses in operative relation to the eyepiece of the binocular, the two lenses of each pair being juxtaposed, one lens being rotarily adjustable with respect to the other and its eyepiece, and transmission means between said adjustable lenses whereby rotarily adjusting one lens of one pair will cause a corresponding rotary adjustment of a lens of the other pair in any adjusted position of the barrels.

2. The combination with a pair of binoculars including two barrels connected to swing about a common axis for interpupillary adjustment toward and from each other and eyepieces carried by said barrels, respectively, of two pairs of polarized lenses, one pair for each barrel, means for mounting each pair to swing about said axis with the barrel and to maintain the axis of said lenses in operative relation to the eyepiece of the binocular, the two lenses of each pair being juxtaposed, one lens being rotarily adjustable with respect to the other and its eyepiece, and transmission means between said adjustable lenses whereby rotarily adjusting one lens of one pair will cause a corresponding rotary adjustment of a lens of the other pair in the opposite angular direction in any adjusted position of the barrels.

3. The combination with a pair of binoculars including two barrels connected to swing about a common axis for interpupillary adjustment toward and from each other and eyepieces carried by said barrels, respectively, of two pairs of polarized lenses, one pair for each barrel, means for mounting each pair to swing about said axis with the barrel and to maintain the axis of said lenses in operative relation to the eyepiece of the binocular, the two lenses of each pair being juxtaposed, one lens being rotarily adjustable with respect to the other and its eyepiece, and transmission means between said adjustable lenses whereby rotarily adjusting one lens of one pair will cause a corresponding rotary adjustment of a lens of the other pair in any adjusted position of the barrels, the connection between the barrels comprising a pair of hinge members.

4. The combination with a pair of binoculars including two barrels connected to swing about a common axis for adjustment toward and from each other, of two pairs of polarized lenses, one pair for each barrel mounted to swing about said axis with the barrel, the two lenses of each pair being juxtaposed, one lens being rotarily adjustable with respect to the other, and transmission means between said adjustable lenses whereby rotarily adjusting one lens of one pair will cause a corresponding rotary adjustment of a lens of the other pair, the connection between the barrels comprising a pair of hinge members, the mounting for the polarized lenses comprising a second pair of hinge members coaxial with said first hinge members secured to said pairs of lenses, respectively.

5. The combination with a pair of binoculars including two barrels connected to swing about a common axis for adjustment toward and from each other, of two pairs of polarized lenses, one pair for each barrel mounted to swing about said axis with the barrel, the two lenses of each pair being juxtaposed, one lens being rotarily adjustable with respect to the other, and transmission means between said adjustable lenses whereby rotarily adjusting one lens of one pair will cause a corresponding rotary adjustment of a lens of the other pair, said transmission comprising flexible drive means and two rotors rotatable with said two adjustable lenses, one of said rotors being driven from the other by said flexible drive means.

6. The combination with a pair of binoculars including two barrels connected to swing about a common axis for adjustment toward and from each other, of two pairs of polarized lenses, one pair for each barrel mounted to swing about said axis with the barrel, the two lenses of each pair being juxtaposed, one lens being rotarily adjustable with respect to the other, and transmission means between said adjustable lenses whereby rotarily adjusting one lens of one pair will cause a corresponding rotary adjustment of a lens of the other pair, said transmission comprising flexible drive means and two rotors rotatable with said two adjustable lenses, one of said rotors being driven from the other by said flexible drive means, and guide means adjacent the axis of said barrels for guiding said flexible drive means.

7. The combination with a pair of binoculars including two barrels connected to swing about a common axis for adjustment toward and from each other, of two pairs of polarized lenses, one pair for each barrel mounted to swing about said axis with the barrel, the two lenses of each pair being juxtaposed, one lens being rotarily adjustable with respect to the other, and transmission means between said adjustable lenses whereby rotarily adjusting one lens of one pair will cause a corresponding rotary adjustment of a lens of the other pair, said transmission comprising flexible drive means and two rotors rotable with said two adjustable lenses, one of said rotors being driven from the other by said flexible drive means, and pulley guide means adjacent the axis of said barrels for guiding said flexible drive means.

8. The combination with a pair of binoculars including two barrels connected to swing about a common axis for adjustment toward and from each other, of two pairs of polarized lenses, one pair for each barrel mounted to swing about said axis with the barrel, the two lenses of each pair being juxtaposed, one lens being rotarily adjustable with respect to the other, the mounting for the polarized lenses comprising a second pair of hinge members coaxial with said first hinge members secured to said pairs of lenses, respectively, and means for mounting said second pair of hinge members on said first pair of hinge members comprising a guide member extending parallel to said axis and a slide member guided by said guide.

9. The combination with a pair of binoculars including two barrels connected to swing about a common axis for adjustment toward and from each other, of two pairs of polarized lenses, one pair for each barrel mounted to swing about said axis with the barrel, the two lenses of each pair being juxtaposed, one lens being rotarily adjustable with respect to the other, the mounting for the polarized lenses comprising a second pair of hinge members coaxial with said first hinge members secured to said pairs of lenses, respectively, and means for mounting said second pair of hinge members on said first pair of hinge members comprising a guide member extending parallel to said axis and a slide member guided by said guide, said second pair of hinge members being movably mounted on said slide member to move said polarized members out of the line of vision.

10. The combination with a pair of binoculars including two barrels connected to swing about a common axis for adjustment toward and from each other, of two pairs of polarized lenses, one pair for each barrel mounted to swing about said axis with the barrel, the two lenses of each pair being juxtaposed, one lens being rotarily adjustable with respect to the other, the mounting for the polarized lenses comprising a second pair of hinge members coaxial with said first hinge members secured to said pairs of lenses, respectively, and means for mounting said second pair of hinge members on said first pair of hinge members comprising a guide member extending parallel to said axis and a slide member guided by said guide, said second pair of hinge members being rockably mounted on said slide member to move said polarized members out of the line of vision.

11. The combination with a pair of binoculars including two barrels connected to swing about a common axis for interpupillary adjustment toward and from each other and eyepieces carried by said barrels, respectively, of two pairs of polarized lenses, one pair for each barrel, means for mounting each pair to swing about said axis with the barrel and to maintain the axis of said lenses in operative relation to the eyepiece of the binocular, the two lenses of each pair being juxtaposed, one lens being rotarily adjustable with respect to the other and its eyepiece, and transmission means between said adjustable lenses whereby rotarily adjusting one lens of one pair will cause a corresponding rotary adjustment of a lens of the other pair in any adjusted position of the barrels, the connection between the barrels comprising a pair of hinge members, the mounting for the polarized lenses comprising a second pair of hinge members secured to said pairs of lenses, respectively.

12. The combination with a pair of binoculars including two barrels connected to swing about a common axis for interpupillary adjustment toward and from each other and eyepieces carried by said barrels, respectively, of two pairs of polarized lenses, one pair for each barrel, means for mounting each pair to swing about said axis with the barrel and to maintain the axis of said lenses in operative relation to the eyepiece of the binocular, the two lenses of each pair being juxtaposed, one lens being rotarily adjustable with respect to the other and its eyepiece, and belt transmission means between said adjustable lenses whereby rotarily adjusting one lens of one pair will cause a corresponding rotary adjustment of a lens of the other pair in any adjusted position of the barrels, the connection between the barrels comprising a pair of hinge members, the mounting for the polarized lenses comprising a second pair of hinge members secured to said pairs of lenses, respectively.

13. The combination with a pair of binoculars including two barrels connected to swing about a common axis for interpupillary adjustment toward and from each other and eyepieces carried by said barrels, respectively, of two pairs of polarized lenses, one pair for each barrel, means for mounting each pair to swing about said axis with the barrel and to maintain the axis of said lenses in operative relation to the eyepiece of the binocular, the two lenses of each pair being juxtaposed, one lens being rotarily adjustable with respect to the other and its eyepiece, belt transmission means between said adjustable lenses whereby rotarily adjusting one lens of one pair will cause a corresponding rotary adjustment of a lens of the other pair in any adjusted position of the barrels, the connection between the barrels comprising a pair of hinge members, the mounting for the polarized lenses comprising a second pair of hinge members secured to said pairs of lenses, respectively, and guide means adjacent the axis of said second pair of hinge members for guiding said belt drive means.

14. A light polarizing device for use with a pair of binoculars having two barrels each carrying an eyepiece connected to swing about a common axis for adjustment toward and from each other to vary the pupillary distance comprising two pairs of polarized lenses, said pairs having means for connecting them to said barrels, respectively, to swing about said axis with the barrels and to maintain the axis of said lenses in operative relation to the eyepiece of the binocular, the two lenses of each pair being juxtaposed, one lens of each pair being rotarily adjustable with respect to the other and its eyepiece, and transmission means between said adjustable lenses whereby rotarily adjusting one lens of one pair will cause a corresponding rotary adjustment of a lens of the other pair in any adjusted position of the barrels.

15. A light polarizing device for use with a pair of binoculars having two barrels each carrying an eyepiece connected to swing about a common axis for adjustment toward and from each other to vary the pupillary distance comprising two pairs of polarized lenses, said pairs having means for connecting them to said barrels, respectively, to swing about said axis with the barrels and to maintain the axis of said lenses in operative relation to the eyepiece of the binocular, the two lenses of each pair being juxtaposed, one lens of each pair being rotarily adjustable with respect to the other and its eyepiece, and transmission means between said adjustable lenses whereby rotarily adjusting one lens of one pair will cause a corresponding rotary adjustment of a lens of the other pair in any adjusted position of the barrels, and a connection between the pairs of lenses comprising a pair of hinge members secured to said pairs of lenses, respectively.

16. A light polarizing device for use with a pair of binoculars having two barrels each carrying an eyepiece connected to swing about a common axis for adjustment toward and from each other to vary the pupillary distance comprising two pairs of polarized lenses, said pairs having mounting means for connecting them to said barrels, respectively, to swing about said axis with the barrels and to maintain the axis of said lenses in operative relation to the eyepiece of the binocular, the two lenses of each pair being juxtaposed, one lens of each pair being rotarily adjustable with respect to the other and its eyepiece, and transmission means between said adjustable lenses whereby rotarily adjusting one lens of one pair will cause a corresponding rotary adjustment of a lens of the other pair in any adjusted position of the barrels, said transmission comprising flexible drive means and two rotors rotatable with said two adjustable lenses, one of said rotors being driven from the other by said flexible drive means.

17. The combination with a pair of binoculars including two barrels connected to swing about a common axis for interpupillary adjustment toward and from each other and eyepieces carried by said barrels, respectively, of two pairs of polarized lenses, one pair for each barrel, means for mounting each pair to swing about said axis with the barrel and to maintain the axis of said lenses in operative relation to the eyepiece of the binocular, the two lenses of each pair being juxtaposed, one lens being rotarily adjustable with respect to the other and its eyepiece, and transmission means between said adjustable lenses whereby rotarily adjusting one lens of one pair will cause a corresponding rotary adjustment of a lens of the other pair, in any adjusted position of the barrels, the connection between the barrels comprising a pair of hinge members, the mounting for the polarized lenses comprising a second pair of hinge members secured to said pairs of lenses, respectively, and the mounting means for each pair of polarized lenses including an annular member fitting around an eyepiece of the binoculars.

18. A light polarizing device for use with a pair of binoculars having two barrels each carrying an eyepiece connected to swing about a common axis for adjustment toward and from each other to vary the interpupillary distance comprising two pairs of polarized lenses, said pairs having means for connecting them to said barrels, respectively, to swing about said lenses in operative relation to the eyepiece of the binocular, the two lenses of each pair being juxtaposed, one lens of each pair being rotarily adjustable with respect to the other and its eyepiece, and transmission means between said adjustable lenses whereby rotarily adjusting one lens of one pair will cause a corresponding rotary adjustment of a lens of the other pair, in any adjusted position of the barrels, the mounting means for each pair of polarized lenses including an annular member fitting around an eyepiece of the binoculars.

19. A light polarizing device for use with a pair of binoculars having two barrels each carrying an eyepiece connected to swing about a common axis for adjustment toward and from each other to vary the interpupillary distance comprising two pairs of polarized lenses, said pair having means for connecting them to said barrels, respectively, to swing about said axis with the barrels and to maintain the axis of said lenses in operative relation to the eyepiece of the binocular, the two lenses of each pair being juxtaposed, one lens of each pair being rotarily adjustable with respect to the other and its eyepiece, and transmission means between said adjustable lenses whereby rotarily adjusting one lens of one pair will cause a corresponding rotary adjustment of a lens of the other pair, in any adjusted position of the barrels, the mounting means for each pair of polarized lenses including an annular member fitting around an eyepiece of the binoculars, one lens of each pair being mounted on its respective annular member.

20. A light polarizing device for use with a pair of binoculars having two barrels each carrying an eyepiece connected to swing about a common axis for adjustment toward and from each other to vary the interpupillary distance comprising two pairs of polarized lenses, each pair having means for connecting them to said barrels, respectively, to swing about said axis with the barrels and to maintain the axis of said lenses in operative relation to the eyepiece of the binocular, the two lenses of each pair being juxtaposed, one lens of each bair being rotarily adjustable with respect to the other and its eyepiece, and transmission means between said adjustable lenses whereby rotarily adjusting one lens of one pair will cause a corresponding rotary adjustment of a lens of the other pair, in any adjusted position of the barrels, the mounting means for each pair of polarized lenses including an annular member fitting around an eyepiece of the binoculars, one lens of each pair being mounted on its respective annular member and the other lens of each pair being rotatably mounted on its respective annular member.

CHARLES J. GLASSER.